United States Patent
Kimiyama et al.

(10) Patent No.: US 9,460,489 B2
(45) Date of Patent: Oct. 4, 2016

(54) IMAGE PROCESSING APPARATUS AND IMAGE PROCESSING METHOD FOR PERFORMING PIXEL ALIGNMENT

(71) Applicant: Kabushiki Kaisha Toshiba, Tokyo (JP)

(72) Inventors: Kenji Kimiyama, Kanagawa-ken (JP); Toshio Sato, Kanagawa-ken (JP); Yoshihiko Suzuki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/636,844

(22) Filed: Mar. 3, 2015

(65) Prior Publication Data

US 2015/0242996 A1 Aug. 27, 2015

Related U.S. Application Data

(63) Continuation of application No. 13/778,504, filed on Feb. 27, 2013, now abandoned.

(30) Foreign Application Priority Data

Mar. 12, 2012 (JP) .................................. 2012-54940

(51) Int. Cl.
*G06T 3/40* (2006.01)
*H04N 5/265* (2006.01)
*G06T 1/20* (2006.01)
*H04N 5/262* (2006.01)

(52) U.S. Cl.
CPC .............. *G06T 3/4053* (2013.01); *G06T 1/20* (2013.01); *H04N 5/265* (2013.01); *H04N 5/2624* (2013.01)

(58) Field of Classification Search
USPC ....................................................... 345/505
See application file for complete search history.

(56) References Cited

U.S. PATENT DOCUMENTS

| | | | | |
|---|---|---|---|---|
| 5,673,380 A | * | 9/1997 | Suzuki | 345/473 |
| 6,401,194 B1 | * | 6/2002 | Nguyen et al. | 712/210 |
| 2004/0175055 A1 | * | 9/2004 | Miller et al. | 382/284 |
| 2009/0016430 A1 | * | 1/2009 | Schmit et al. | 375/240.01 |
| 2009/0028243 A1 | * | 1/2009 | Suzuki | H04N 19/56 375/240.15 |
| 2010/0027664 A1 | * | 2/2010 | Sato | 375/240.16 |
| 2010/0239184 A1 | * | 9/2010 | Furukawa et al. | 382/284 |

FOREIGN PATENT DOCUMENTS

| | | |
|---|---|---|
| JP | 2010-218271 | 9/2010 |
| JP | 2011-61603 | 3/2011 |

* cited by examiner

*Primary Examiner* — Barry Drennan
*Assistant Examiner* — Terrell Robinson
(74) *Attorney, Agent, or Firm* — Oblon, McClelland, Maier & Neustadt, L.L.P.

(57) ABSTRACT

An image processing apparatus is provided, which performs alignment of pixels on a reference frame and on a standard frame, executes an image reconfiguration based on an alignment result, and generates a high resolution image of a frame from low resolution images of the reference and the standard frames, the apparatus including a memory configured to store an input video and to output an image processed video; and a plurality of arithmetic processors configured to perform in parallel, at the time of the alignment, a first alignment processing in a first direction from the reference to the standard frame by a first arithmetic processor, and a second alignment processing in a second direction from the standard to the reference frame by a second arithmetic processor, the second direction being opposite to the first direction, processing results of the first and the second alignment processings being shared among the processors.

8 Claims, 10 Drawing Sheets

ALIGNMENT PROCESSING 21

ALIGNMENT PROCESSING 12

START CALCULATION PROCESSING 21 AND PROCESSING 12 IN REVERSE SEQUENCE FOR EACH LINE

RESULT BUFFER 21

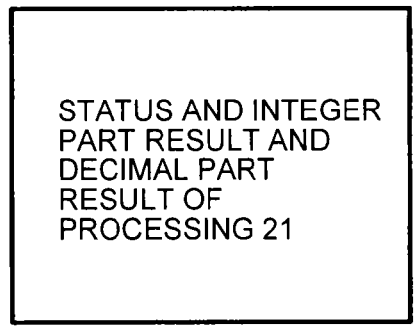

STATUS AND INTEGER PART RESULT AND DECIMAL PART RESULT OF PROCESSING 21

RESULT BUFFER 12

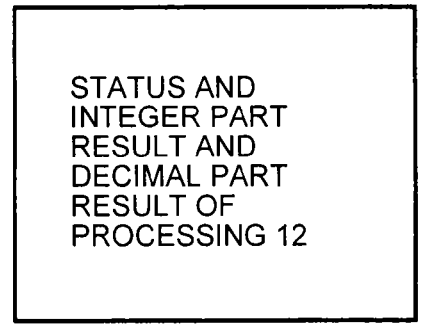

STATUS AND INTEGER PART RESULT AND DECIMAL PART RESULT OF PROCESSING 12

FIG. 8

ALIGNMENT PROCESSING 21

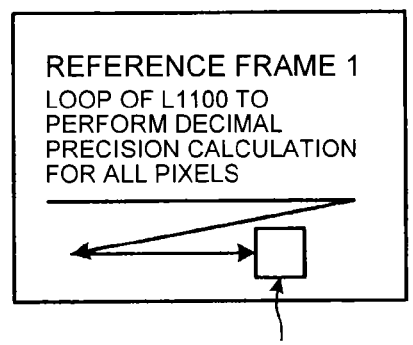

REFERENCE FRAME 1
LOOP OF L1100 TO PERFORM DECIMAL PRECISION CALCULATION FOR ALL PIXELS

BLOCK WHOSE CENTER IS POINT TO SEARCHED FOR

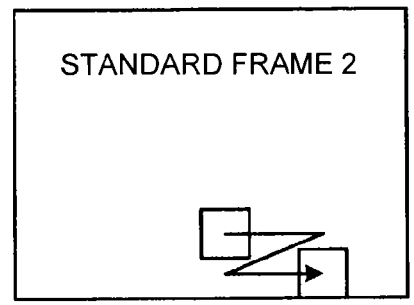

STANDARD FRAME 2

CALCULATE SSD WHILE MOVING BLOCK (PROCESSING IN S1002)

FIG. 9

ALIGNMENT PROCESSING 21     ALIGNMENT PROCESSING 12
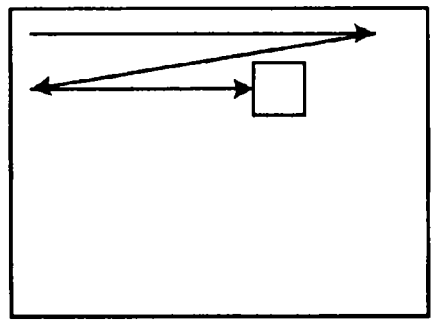 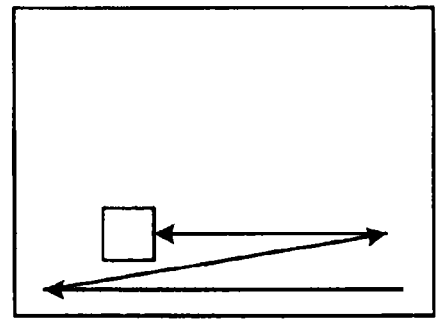
START CALCULATION PROCESSING 21 AND
PROCESSING 12 IN REVERSE SEQUENCE
FIG. 11
ALIGNMENT PROCESSING 21     ALIGNMENT PROCESSING 12
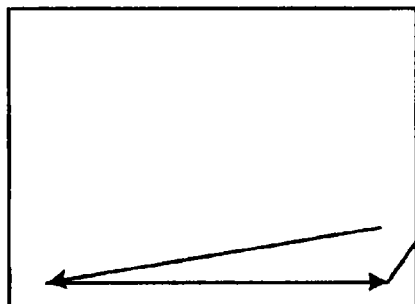 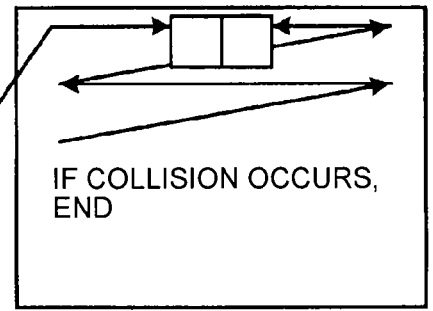
IF COLLISION OCCURS,
END
ONE WHICH HAS FINISHED PROCESSING IN FIRST
PERFORMS ANOTHER ONGOINGLY (IN S2010 OR LATER)
FIG. 12

START CALCULATION PROCESSING 21 AND PROCESSING 12 IN REVERSE SEQUENCE FOR EACH LINE

ONE WHICH HAS FINISHED PROCESSING IN FIRST PERFORMS ANOTHER ONGOINGLY (IN S3010 OR LATER)

IMAGE PROCESSING APPARATUS AND IMAGE PROCESSING METHOD FOR PERFORMING PIXEL ALIGNMENT

CROSS-REFERENCE TO RELATED APPLICATION

This application is a continuation of U.S. application Ser. No. 13/778,504, filed Feb. 27, 2013 and is based upon and claims the benefit of priority from the prior Japanese Patent Application No. 2012-054940, filed on Mar. 12, 2012, the entire contents of each of which are incorporated herein by reference.

FIELD

Embodiments of the present invention relate to an image processing apparatus and an image processing method.

BACKGROUND

Recently, products such as TVs having a display which uses super-resolution technology are marketed. The super-resolution technology reproduces detailed portions (components of not less than a Nyquist frequency) lost at the time of sampling pixels of an image (at the time of photoelectric conversion by an image pickup device and reduction processing of an image) by image processing. For example, when super-resolution technology is used for displaying a video of a video camera of the NTSC system and a video of a DVD with low resolution on a large-screen liquid crystal TV, the detailed portions are reproduced and thereby a clear image with high resolution can be obtained.

Various systems have been proposed for super-resolution technologies. They are a super-resolution in a frame system, a dictionary based super-resolution system, and a multi-frame super-resolution system and so on. A multi-frame super-resolution system of them has particularly a high reproduction factor of detailed portions of an image, and has high performance. The multi-frame super-resolution system performs an alignment processing and a reconfiguration processing. The alignment processing, from a plurality of frames which are backward and forward in terms of time (a standard frame and a reference frame), detects the same portions of the same object as the corresponding points. The reconfiguration processing generates an image with high resolution using the information of the corresponding points of the reference frame and the standard frame obtained by the alignment processing. Thus a high resolution frame of one frame is generated from an amount of information larger than an amount of information of a single frame. The alignment processing and the reconfiguration processing are continuously executed while the frames are brought forward one by one, and thereby a video with high resolution can be generated. In addition, the reconfiguration processing includes a system using a repetition processing in which the image quality is high but the processing load is also high, and a system without using a repetition processing in which the image quality is low but the processing load is also low.

By the way, a multi-frame super-resolution processing includes two embodiments of a software processing by use of a CPU, and a dedicated hardware processing. Conventionally, it prevailed that an arithmetic processing unit is mounted in a personal computer. In a software processing by a CPU in the personal computer like this, each processing of a multi-frame super-resolution processing is executed in sequence. That is, an alignment processing of a precedent frame with a standard frame is executed, and an alignment processing of the standard frame with a subsequent frame is executed, and finally, a reconfiguration processing is executed. Or, there may be a case in which pseudo parallel processings are executed with a software programming technology named multithread, in a time-sharing mode and in order of priority which an OS (Operating system) controls. But, in this technology, there may be even a case which requires more time by the overhead for switching over the processings than a case in which the processings are executed sequentially.

Recently, high performance products each having a CPU with a plurality of internal arithmetic units have prevailed. An arithmetic processing unit is called a core, and having a plurality of cores, such a CPU is called a multi-core CPU or a many-core CPU. The CPU can operate a plurality of programs in parallel using a plurality of the arithmetic processing units.

In addition, not limited to a CPU which is mounted on a personal computer, it has been progressing that an embedded CPU and a DSP (Digital Signal Processor) are formed to have multi cores or many cores. If a plurality of arithmetic processing units is utilized, an alignment processing of a precedent frame with a standard frame, an alignment processing of the standard frame and a subsequent frame, and a reconfiguration processing can be executed in parallel.

However, in the case provided with single arithmetic processing unit, it is necessary to align all pixels in the precedent and subsequent reference frames with the standard frame which is to be enlarged in the super-resolution processing, and since a repetition search (a block matching) is performed within a frame for a pattern similar to a block with a definite size, it was a problem that the processing load is high. In addition, even in the case in which a system using a repetition processing is employed as the reconfiguration processing so as to obtain high image quality, there was a problem that the processing load becomes high. Even if a multi-core CPU is used to address these problems, in order to operate a program in parallel using a plurality of arithmetic processing units, ingenuity in an algorithm is required, and it is not possible at present to automatically operate a program in parallel. Consequently, an algorithm for multi-frame super-resolution has been desired which can effectively operate a plurality of arithmetic processing units of a multi-core CPU in parallel.

On the other hand, memory architecture of recent years has a two-hierarchy configuration (more hierarchies, sometimes) composed of a main memory and a cache memory. A main memory has a large capacity, but the speed thereof drops at the time of random access. Though a cache memory has a small capacity, it operates at a high speed at the time of random access. In a software processing by a CPU, and also in a dedicated hardware processing, there is a problem of a memory access band. Unless the data required for processing is preferably arranged on a cache memory, the processing speed might drop by a bottle neck of a memory access band between the main memory and the cache memory. Since the image data has a large size in particular, and these problems come to the front, solutions to the drop in the processing speed have been desired.

BRIEF DESCRIPTION OF THE DRAWINGS

FIG. 8 is a diagram showing an example of a result buffer;

FIG. 9 is a diagram showing an outline of an alignment processing;

FIG. 11 is a diagram showing the relation between an alignment processing [21] and an alignment processing [12];

FIG. 12 is a diagram showing taking over a part of the alignment processing [12] by an arithmetic processing unit performing the alignment processing [21];

DETAILED DESCRIPTION

An image processing apparatus of the embodiment performs alignment of pixels on a reference frame on a standard frame to be made to have high resolution, and executes reconfiguration of an image based on a result the alignment, to thereby generate a high resolution image of a frame from low resolution images of a plurality of frames. The image processing apparatus includes a main memory to store a video taken in from outside and to output a video which has been image processed, and a plurality of arithmetic processing units which can operate in parallel, and the plurality of arithmetic processing units, at the time of executing alignment between the standard frame and the reference frame, operate in parallel a first alignment processing and a second alignment processing which are in the reverse relation to each other in terms of the relation of the standard and the reference, and the first alignment processing and the second alignment processing share their processing results.

Figure 1:
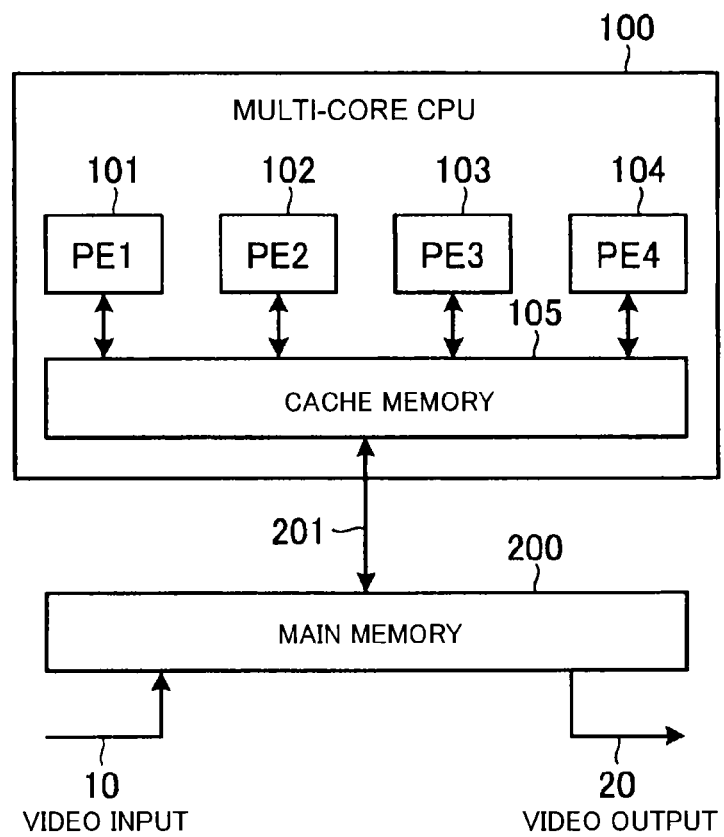
FIG. 1 is a block diagram of an image processing apparatus of an embodiment using a multi-core CPU.

FIG. 1 is a block diagram of an image processing apparatus of an embodiment using a multi-core CPU.

A multi-core CPU 100 includes four arithmetic processing units (PE1-PE4) 101-104 and a cache memory 105, and is connected to an external main memory 200 through a bus 201. A video is taken in from outside as a video input 10, and stored in the main memory 200 by a DMA (Direct Memory Access) control (not shown) and so on. Necessary image processing is given to the video by the multi-core CPU 100, and then the video is outputted as a video output 20 from the main memory 200.

The multi-core CPU 100 has four arithmetic processing units, and thereby can execute four programs in parallel by four arithmetic processing units. Accordingly, under a program created so as to execute parallel processing, the multi-core CPU 100 can concurrently execute four processings in the program. In addition, the program is stored in a nonvolatile memory device (not shown) provided in the relevant image processing apparatus, such as an ROM and an HDD, and at the time of start or execution, the program is loaded into the main memory 200 and executed by the multi-core CPU 100.

The cache memory 105 can operate at a higher speed than the main memory 200 in terms of random access speed. The cache memory 105 temporarily stores the same content as the content stored in the main memory 200, and each arithmetic processing unit can read out the content from the cache memory 105. In addition, the content which is not stored in the cache memory 105 is read out from the main memory 200 and sent to the arithmetic processing unit, and concurrently written into the cache memory 105, too. Since the size of the cache memory 105 is smaller than that of the main memory 200, the data which goes out of use is erased by overwriting. For the reason, using continuous data in as narrow address range as possible leads to improvement in processing speed. The video data as a result of the processing is outputted outside by the DMA control and so on as the video output 20. If the image processing apparatus is a PC, the video data is displayed on a display.

Figure 2:
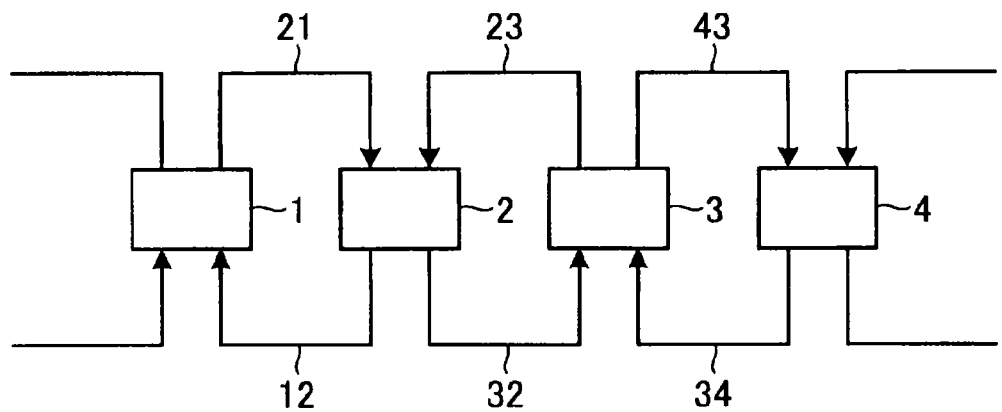
FIG. 2 is a diagram showing the relation between frames in an alignment processing of a super-resolution processing.

FIG. 2 shows the relation between frames in an alignment processing of a super-resolution processing. Each of numerals 1-4 in the drawing indicates one frame of the video, and the numerals indicate frame numbers, respectively. A frame of a source of an arrow is a reference frame, and a frame of a destination of an arrow is a standard frame. For example, in the drawing, an alignment processing [21] means to determine a coordinate on the standard frame 2 of a pixel of the standard frame 2 corresponding to a pixel of the reference frame 1. A processing to determine a coordinate of a pixel on a standard frame corresponding to a pixel of a reference frame is called an alignment processing. In the alignment processing [12] the reference frame and the standard frame are interchanged, compared with the alignment processing [21].

There are methods, such as a block matching method described above for the search for alignment. A block of a fixed size which has at the center a pixel to be aligned is set up on the reference frame, and SSD (Sum of Square Difference) or SAD (Sum of Absolute Difference) is repeatedly obtained between the block and a block which is set up on the standard frame, while setting up new block on the standard frame by moving the block on the standard frame one pixel by one pixel. The coordinate of a location where the SSD value or the SAD value is smallest is determined as a corresponding point coordinate with integer precision. In addition, the coordinate is improved so as to have decimal precision using a parabolic fitting method and a conformal line method. This procedure is repeated for all pixels on the reference frame. This method is a commonly-used one, and a searching system for alignment in the present embodiment is not limited to this system. As a method except the block matching method, a phase correlation limiting method and an optical flow method are known.

In addition, in order to simplify the description, only the frames backward and forward the standard frame are used as the reference frame in FIG. 2, but more frames may be used as the reference frame. However, even if the number of the reference frames is increased, the improvement in picture quality is limited. Accordingly, the number of the reference frames is usually determined from a viewpoint of the balance between an amount of processing and picture quality.

Figure 3:
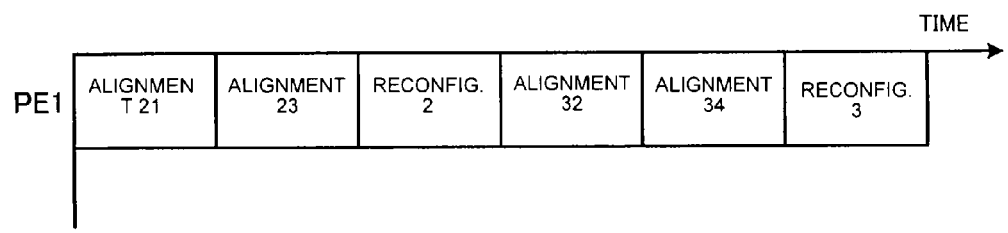
FIG. 3 is a diagram to describe a processing system of a comparative example 1 using a multi-core CPU.

In FIG. 3, a processing system of a comparative example 1 using a multi-core CPU is shown. In a program without regard for a multi-core CPU, one processing is sequentially executed by the one arithmetic processing unit (PE1). Numbers of the frames at the time of alignment are the same as in the example of FIG. 2. To begin with, the frame 2 is used as the standard frame, the frame 1 is used as the forward reference frame, and the frame 3 is used as the backward reference frame 3. And the alignment processing [21] between the frame 1 and the frame 2 is executed, and then the alignment processing [23] between the frame 3 and the frame 2 is executed. Using these results, a reconfiguration processing [2] which makes the frame 2 high resolution is executed. Next, the frame 3 is used as the standard frame, the frame 2 is used as the forward reference frame, and the frame 4 is used as the backward reference frame. And the alignment processing [32] between the frame 2 and the frame 3 is executed, and then the alignment processing [34] between the frame 4 and the frame 3 is executed. Using these results, a reconfiguration processing [3] which makes the frame 3 high resolution is executed. The processings are sequentially performed like this. In this case, even if there is a plurality of arithmetic processing units, only one of them is used.

Figure 4:
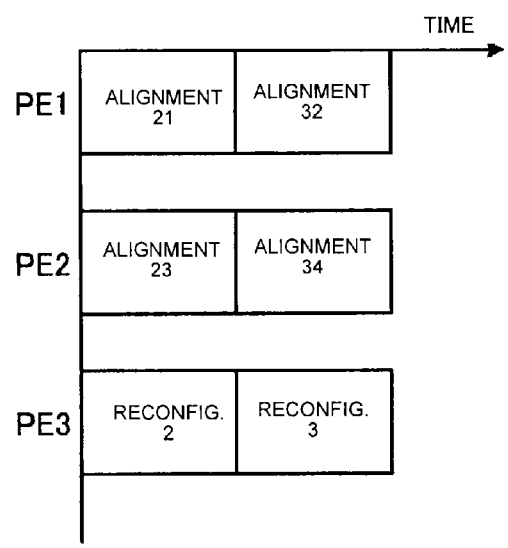
FIG. 4 is a diagram to describe a processing system of a comparative example 2 using a multi-core CPU.

In FIG. 4, a processing system of a comparative example 2 using a multi-core CPU is shown. In this example, programming is made in consideration of a multi-core CPU, and three processings are operated in parallel by the three arithmetic processing units (PE1, PE2 and PE3). In a first half of FIG. 4, the total three frames including the frames 1-3 are used. Since the result of the alignment processing [21] and the result of the alignment processing [23] are concurrently inputted into the reconfiguration processing [2], the reconfiguration processing [2] has a problem of processing load. That is, when the results of the two alignment processings are concurrently inputted, actually, either of the two results is forced to wait, or it is necessary that a buffer is provided and either is temporarily stored in the buffer. The reconfiguration processing [3] in a second half of FIG. 4 has the same problem of processing load as that of the reconfiguration processing [2].

Figure 5:
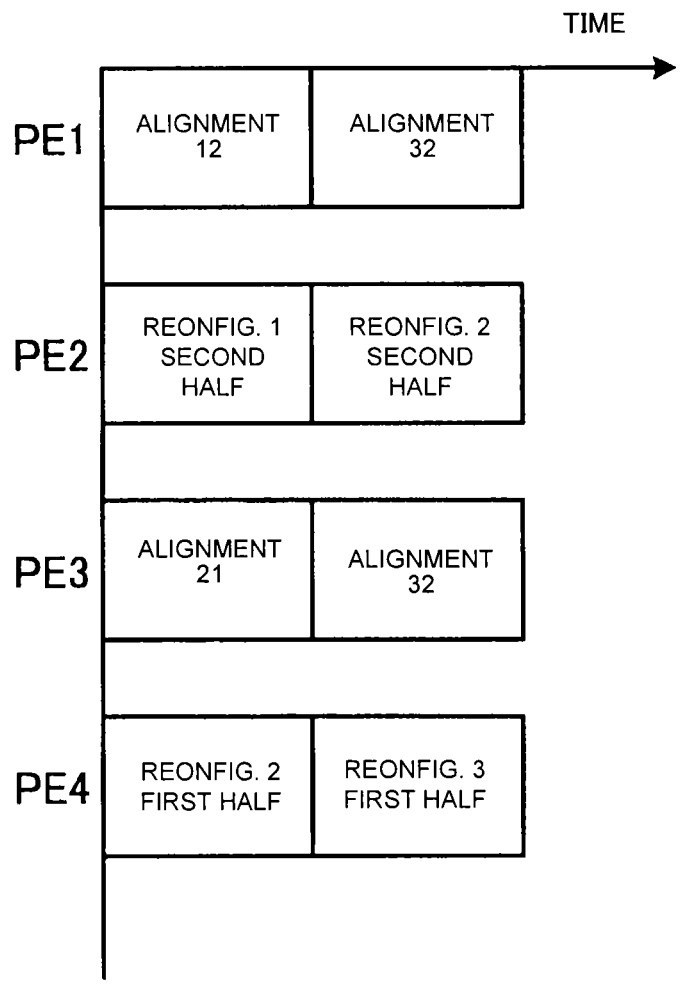
FIG. 5 is a diagram to describe a first processing system using a multi-core CPU.

FIG. 5 shows a first processing system of the present embodiment using a multi-core CPU. In the first processing system of the present embodiment, programming is made in consideration of a multi-core CPU, and four processings are operated in parallel by the four arithmetic processing units (PE1, PE2, PE3 and PE4). The characteristic portion different from the processing system of the comparative example 2 is a portion in which the alignment processings in the different directions such as the alignment processing [21] and the alignment processing [12] are executed in parallel. The alignment processings of the different directions are alignment processings in which the relation between the reference and the standard are reverse. In this processing system, one alignment processing utilizes a result of the other alignment processing. For example, it is obtained in first by the alignment processing [21] that a pixel of the coordinate (10, 20) on the reference frame 1 corresponds to a pixel of the coordinate (12, 22) on the standard frame 2, that is, the coordinate (12, 22) on the standard frame 2 is a corresponding point of the coordinate (10, 20) on the reference frame 1. In this case, the alignment processing [12], without executing the calculation to obtain a corresponding point on the standard frame 1 which corresponds to the coordinate (12, 22) on the reference frame 2, utilizes a result of the alignment processing [21] and adopts the coordinate (10, 20) on the frame 1 which is the result of the alignment processing [21] as a coordinate of a corresponding point. However, since the decimal precision part of the coordinate can not be commonly utilized, it is necessary to calculate the decimal precision part of the coordinate for each alignment processing. In addition, a point on a reference frame and a point on a standard frame which corresponds to the point on the reference frame are collectively called a corresponding-point pair.

In addition, in the example of FIG. 4 reading data of three frames has been required, but since in the present embodiment reading data of two frames is required, the memory access band through the bus 201 of FIG. 1 can be kept low. In addition, when the data of the three frames used for the alignment processings can not be stored in the cache memory 105 of FIG. 1, frequent interchange of the data occurs in the example of FIG. 4, and thereby the processing ability drops. In the present embodiment, since the data of only the two frames is used, the possibility of interchanging data becomes low. In order to suppress the interchange of data, it is possible that the memory range in which the interchange does not occur is obtained from the capacity of the cache memory 105 and the control method thereof, and speed control is performed so that the two alignment processings can commonly use the memory range. For example, if this method is combined with the method described in Japanese Patent Application Publication 2011-61603, the interchange of data can be more suppressed.

In the present embodiment, as shown in FIG. 5, the reconfiguration processing is divided into two stages of a first half and a second half in terms of time. That is, the processing load is dispersed by executing the pipeline operation. By this means, the reconfiguration processing becomes in one to one relation with the alignment processing, and thereby a layover required between a plurality of alignment processings, and a buffer for the layover become unnecessary. In addition, in the example of FIG. 5, the first half of the reconfiguration processing [2] corresponds to the alignment processing [21], and the second half of the reconfiguration processing [2] corresponds to the alignment processing [23]. The first half of the reconfiguration configuration [2] generates an initial image with an interpolation method, for example, and reconfigures an intermediate image from the initial image and the processing result of the alignment processing [21]. And, the second half of the reconfiguration processing [2] reconfigures a high resolution image composed of a frame by combining the processing result in the first half of the reconfiguration processing [2] and the processing result of the alignment processing [23].

Figure 6:
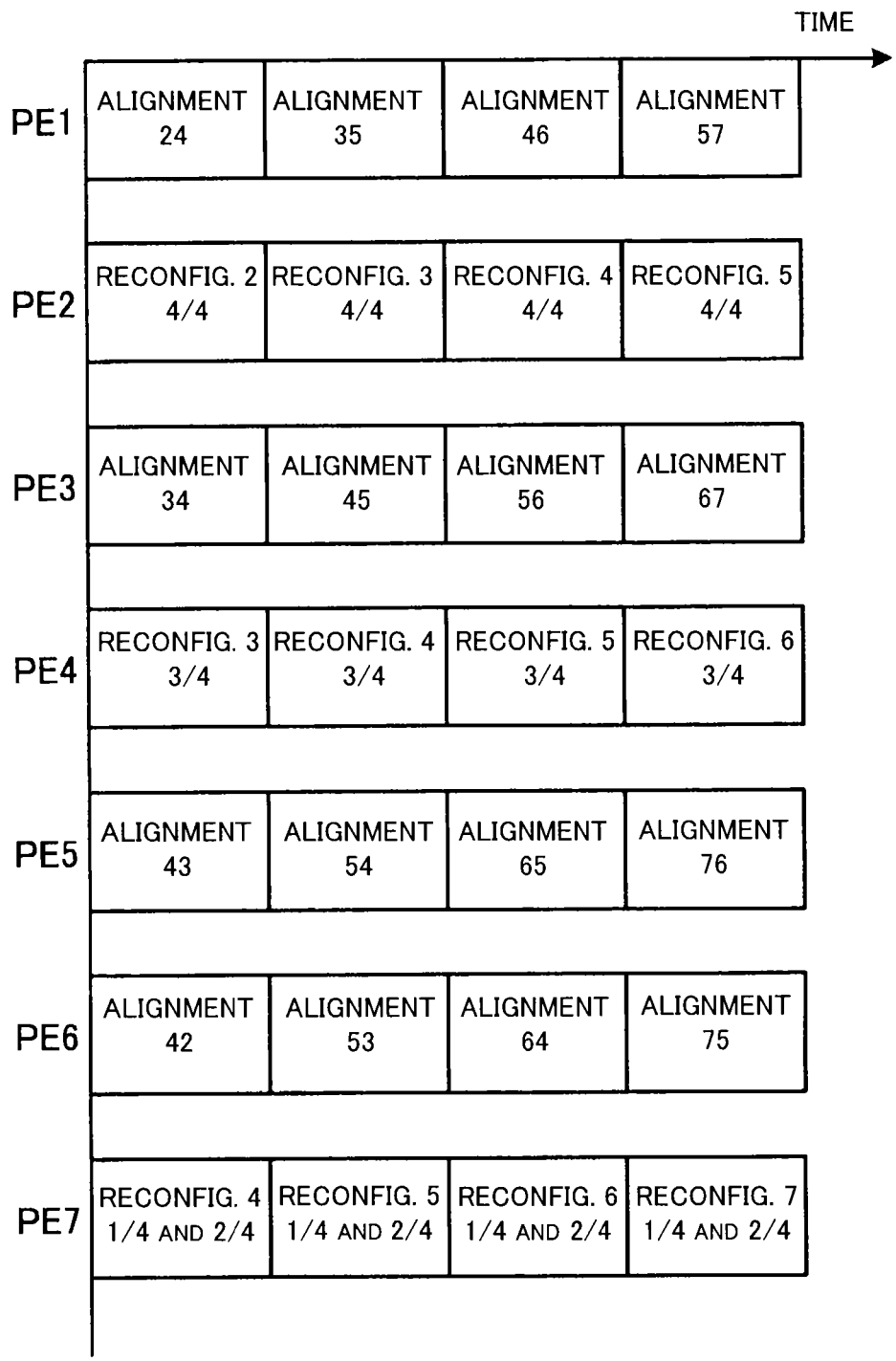
FIG. 6 is a diagram to describe a second processing system using a multi-core CPU.

FIG. 6 shows a second processing system of the present embodiment with the four reference frames composed of the two backward and two forward frames using a multi-core CPU in. In the second processing system of the present embodiment, seven processings are operated in parallel by the seven arithmetic processing units (PE1, PE2, PE3, PE4, PE5, PE6 and PE7). In the parallel system in which the example of FIG. 4 is extended, the memory access band for the alignment processing is five frames. On the other hand, in the second processing system of the present embodiment, the memory access band is suppressed to three frames. In the first stage, the processing is executed with the alignment processing [24] and the alignment processing [42] being paired, and the alignment processing 34 and the alignment processing 43 being paired.

In addition, in the example of FIG. 6, the reconfiguration processing [4]-[1/4] and the reconfiguration processing [4]-[2/4] correspond to the alignment processing 42 and the alignment processing 43, respectively. The symbols 1/4, 2/4, 3/4 and 4/4 mean a first quarter, a second quarter, a third quarter and a fourth quarter, respectively. The reconfiguration processing [4]-[3/4] corresponds to the alignment processing [45]. In addition, the reconfiguration processing [4]-[4/4] corresponds to the alignment processing [46]. The reconfiguration processing [4]-[1/4] and the reconfiguration processing [4]-[2/4] generate an initial image, and in addition reconfigure an intermediate image from the initial image, the processing result of the alignment processing [42] and the processing result of the alignment processing [43]. The reconfiguration processing [4]-[3/4] further reconfigures an intermediate image from the processing results of the reconfiguration processing [4]-[1/4] and the reconfiguration processing [4]-[2/4], and the processing result of the alignment processing [45]. The reconfiguration processing [4]-[4/4] reconfigures a high resolution image for a frame by combining the processing result of the reconfiguration processing [4]-[3/4] and the processing result of the alignment processing [46].

In the example of FIG. 6, though the memory access band of the reconfiguration processing increases, since the number of times of repeating the reconfiguration processing (number of pixels×number of times of reconfiguration (usually not more than 10 times)) is smaller than the number of times of repeating the alignment processing (number of searching frames×number of pixels×searching range), an effect to the processing speed is small In addition, the processing pattern shown in the drawing is an example, and the processing pattern is not limited to this example.

In addition, FIG. 5 and FIG. 6 show the sequence of the processing on a conceptual basis, and the timing when the processing is actually executed in each of the arithmetic processing unit varies depending on the processing load and so on.

(First Embodiment)

Next, as a system in which a first alignment processing and a second alignment processing which are paired share the processing results to each other, a system which writes the processing result not only in a result buffer of self but in a result buffer of a partner directly will be described. The first processing system in FIG. 5 will be described, for example.

Figure 7:
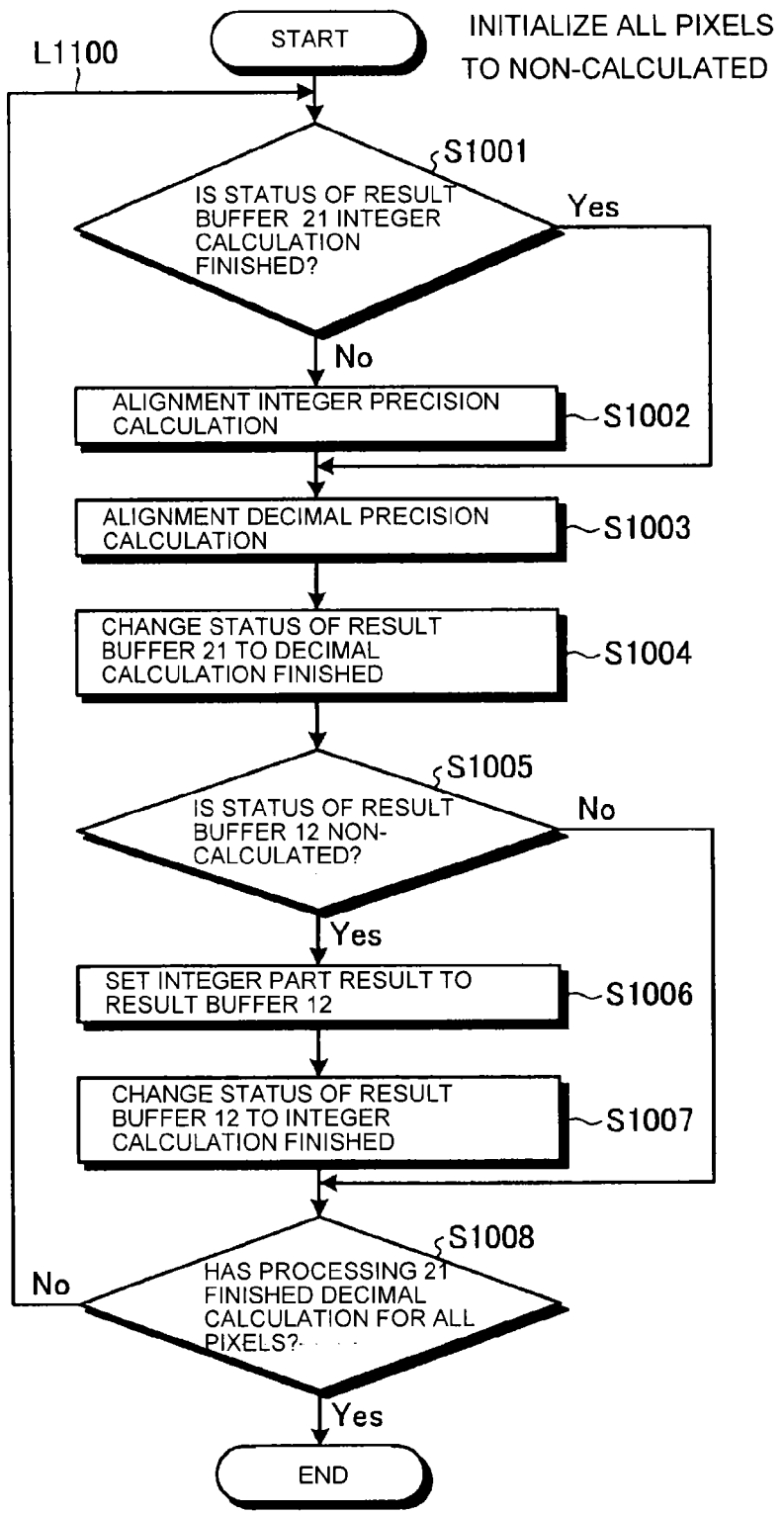
FIG. 7 is a flow chart of an alignment processing by a method which directly writes the processing result into a result buffer of a partner in a first embodiment.

FIG. 7 shows a flow chart of an alignment processing by a method to directly write the processing result into a result buffer of a partner. Here, the alignment processing [21] by the arithmetic processing unit (PE3) is taken for example. But, the alignment processing [12] by the arithmetic processing unit (PE1) is executed in parallel with the alignment processing [21] in the procedure of the flow chart. Result buffers are provided in the cache memory 105. The result buffers are provided for each alignment processing, and each result buffer has a storage area for the number of pixels of the input image per frame.

As shown in FIG. 8, in each of the result buffers, an integer calculation result (integer part result (=integer part of the coordinate)) by integer precision calculation, and a decimal calculation result (decimal part result (=decimal part of the coordinate)) by decimal precision calculation, both of which are the processing result of the corresponding alignment processing, and a status indicating the processing state (integer calculation finished/decimal calculation finished/non-calculated) are stored. In addition, the status of each of the result buffers is initialized to a non-calculated state at the beginning of the alignment processing. In the following description, the result buffer corresponding to the alignment processing [21] is described as a result buffer [21], and the result buffer corresponding to the alignment processing [12] is described as a result buffer [12].

To begin with, in a step S1001, the status of the result buffer 21 in which the status of the alignment processing [21] is stored is checked with respect to a processing target pixel, and thereby it is checked whether the status is already made "integer calculation finished" by the alignment processing [12]. At this time, when the coordinate of the processing target pixel is already calculated in the integer precision calculation (integer calculation) as the corresponding point by the alignment processing [12], the status of the result buffer 21 is set to "integral calculation finished" with respect to the relevant pixel by the alignment processing [12]. Accordingly, in this case, the check result is determined as Yes in the step S1001, and the processing moves to a step S1003.

On the other hand, when the status of the result buffer 21 is not "integer calculation finished" with the above-described check (No, in the step S1001), block matching of the alignment processing [21] is executed in a following step S1002, and thereby the integer part result of the coordinate of the corresponding point is obtained based on the calculated SSD (refer to the right side of FIG. 9)

Subsequently, the decimal precision calculation of the alignment processing [21] is executed in the step S1003, and thereby the decimal part result of the coordinate of the corresponding point pair is obtained. And the calculation result of the integer part and the calculation result of the decimal are respectively written into the result buffer [21].

When the decimal precision calculation of the corresponding point is finished with respect to the pixel that is the alignment target, the status of the result buffer [21] is changed to "decimal calculation finished" in a step S1004.

On the other hand, when the status is "integer calculation finished" with the check of the status of the result buffer 21 in the above-described step S1001, the integer precision calculation of the corresponding point is finished by the alignment processing [12]. For the reason, the integer precision calculation (the above-described step S1002) in the alignment processing [21] is omitted, and the processing of or later the processing of the decimal precision calculation in the above-described step S1003 is executed.

After the step S1004, in a step S1005, the status of the result buffer 12 of the alignment processing [12] is further checked, with respect to the processing target pixel. That is, it is checked whether the pixel of the coordinate of the corresponding point which is obtained in the alignment processing [21] has been calculated already as the pixel at the reference frame in the alignment processing [12]. When the status is "non-calculated" (Yes, in the step S1005), the integer part result obtained in the step S1002 is set to the result buffer [12] in a step S1006, and the status of the result buffer [12] is changed to "integer calculation finished" in a step S1007. And, only the decimal part is calculated at the time of calculating the relevant pixel in the alignment processing [12]. On the other hand, when the status is not "not calculated" in the check of the step S1005, (NO, in the step S1005), without executing anything to the result buffer 12, the processing moves to a step S1008.

After a series of the above-described processings is executed, it is determined in the step S1008 whether the alignment processing [21] has finished decimal calculation for all the pixels in the reference frame. If there is an unprocessed pixel (No, in the step S1008), the processing returns to the step S1001 (L1100), and a series of the processings is repeated (refer to the left side in FIG. 9). If not, the alignment processing [21] ends. Then, the alignment processing will be executed for the subsequent frame by the same arithmetic processing unit.

When a coordinate of a corresponding point is obtained in first by one alignment processing like this, an integer part calculation of a coordinate of a corresponding point in the other alignment processing which is belatedly executed is omitted. Accordingly, in the alignment processing in the present embodiment, the amount of processing is reduced, and in addition to the speeding up by the parallel processing, and the processing can be further speeded up as a whole.

In addition, in the above-described example, the alignment processing which has finished the calculation in first directly writes the integer calculation result in the result buffer of a partner of the paired alignment processings. By this means, it is realized to share the processing results to each other. But in the case that the history of the result of the alignment processing is stored in the main memory 200 for a given length of time, each the alignment processing may refer to the history information before alignment and use the calculation result thereof with respect to the pixel of which the corresponding point has been calculated.

As described above, according to the present embodiment it is possible to provide an image processing apparatus and an image processing method which, for the super-resolution processing, can efficiently operate a plurality of arithmetic processing units in parallel, and further can effectively perform memory access.

(Second Embodiment)

In the above-described first embodiment, when one processing of a first alignment processing and a second alignment processing which constitute a pair has finished the calculation of the corresponding points at the standard frame for pixels at a certain reference frame earlier than the other processing, the other processing utilizes the integer calculation result, and thereby the other processing can omit the integer precision calculation. In the processing of the present embodiment described later, in addition to the above-described processing, in the case that when a series of the processings has been completed for the all pixels at the reference frame which the one alignment processing targets, the other alignment processing which forms a pair with the one alignment processing has not been completed, the one alignment processing takes over the other alignment processing for a part of the remaining pixels of the processing target. At this time, each of the two arithmetic processing units comes to execute the alignment processing for the remaining pixels of the same reference frame in the reverse sequence to each other.

Figure 10:
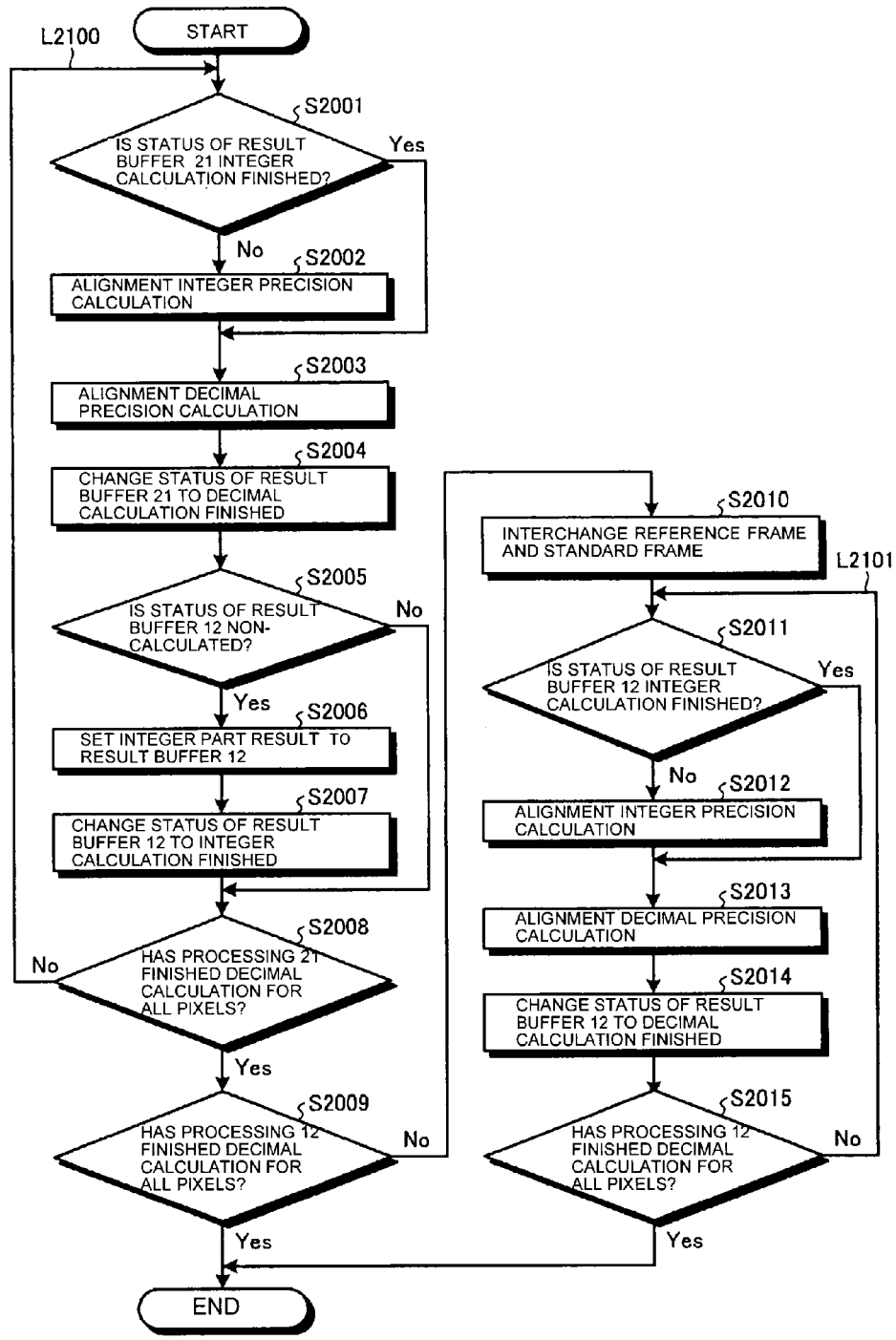
FIG. 10 is a flow chart of an alignment processing by a method which directly writes the processing result into a result buffer of a partner in a second embodiment.

Also in the present embodiment, the first processing system in FIG. 5 will be described, for example. FIG. 10 shows a flow chart of the present embodiment. A step S2001—a step S2008 are the same as the step S1001—the step S1008 in the first embodiment. In the first embodiment, the sequence of the selection of pixels is the same for the alignment processing [21] and the alignment processing [12]. In the present embodiment, the sequence of the selection of pixels at the reference frame in the alignment processing [12] by the arithmetic processing unit (PE1) is reverse to the sequence of the selection of pixels at the reference frame in the alignment processing [21] by the arithmetic processing unit (PE3) (refer to FIG. 11). The alignment processing [21] is executed as shown in FIG. 9.

Since the step S2001—the step S2008 are the same as the step S1001—the step S1008 in the above-described first embodiment, the description thereof will be omitted. When the calculation of the alignment processing [21] is completed for the all pixels at the reference frame (Yes, in the step S2008), it is determined in a step S2009 whether the alignment processing [12] has finished the decimal calculation for the all pixels at the reference frame. The determination can be performed by referring to the status of the result buffer [12] of the alignment processing [12].

Here, when the alignment processing [12] has also finished the decimal calculation for the all pixels at the reference frame side (Yes, in the step S2009), the alignment processing [21] ends. If the alignment processing [12] by the arithmetic processing unit (PE1) has not finished the decimal calculation for the all pixels at the reference frame (No, in the step S2009), the arithmetic processing unit (PE3) exchanges the reference frame and the standard frame of the alignment processing [21] in a step S2010. That is, the arithmetic processing unit (PE3) which executes the alignment processing [21] takes partial charge of the alignment processing for the pixels which the alignment processing [12] by the arithmetic processing unit (PE1) has not processed.

A step S2011 through a step S2014 following the step S2010 are the processings which corresponds to the step S2001—the step S2004 and are originally executed by the alignment processing [12]. Here, the alignment processing [21] which has finished the processing in first takes over a part of the alignment processing [12] (refer to FIG. 11). That is, the arithmetic processing unit (PE3) to execute the alignment processing [21] takes over a part of the alignment processing [12] by the arithmetic processing unit (PE1).

Next, it is determined in a step S2015 whether the alignment processing [12] has finished the decimal calculation for the all pixels of the reference frame side. At this time, when the decimal calculation has not been finished (No, in the step S2015), the processing returns to the step S2011 (L2101), and thereby a series of the processings is repeated. On the other hand, when the decimal calculation has been finished (Yes, in the step S2015), the arithmetic processing unit (PE3) ends the alignment processing [21].

Incidentally, as shown in the right side of FIG. 12, when the take over processing by the arithmetic processing unit (PE3) and the original alignment processing [12] collide with each other on the reference frame of the original alignment processing [12], the status of the result buffer [12] becomes "decimal calculation finished" for the all pixels at the reference frame of the alignment processing [12]. At this time, in the step S2015, the all pixels at the reference frame are determined as "decimal calculation finished", and a series of the processings shown in FIG. 10 ends.

As described above, when one processing of the paired alignment processings has finished the processing in first, the arithmetic processing unit to execute the alignment processing which has finished the processing in first takes over a part of the other processing of the paired alignment processings. Thereby, the load of the arithmetic processing unit to execute the processing of which a part is taken over is dispersed, and the processing speed of the paired alignment processings as a whole can be improved.

As described above, according to the present embodiment it is possible to provide an image processing apparatus and an image processing method which, for the super-resolution processing, can efficiently operate a plurality of arithmetic processing units in parallel, and further can effectively perform memory access.

(Third Embodiment)

Figure 14:
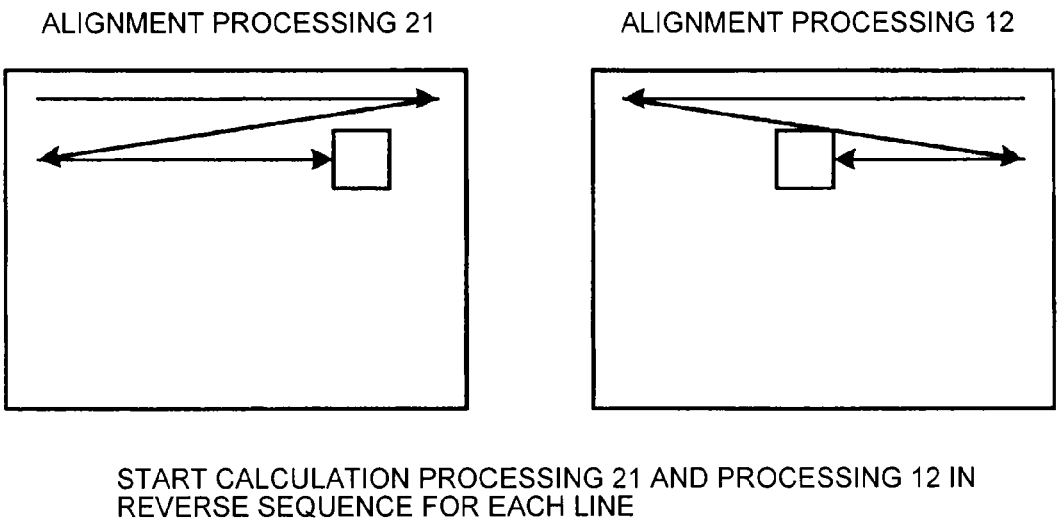
FIG. 14 is a diagram showing the relation between the alignment processing [21] and the alignment processing [12]

In the above-described second embodiment, when a series of the processings has been completed for the all pixels at the reference frame which the one processing of the paired alignment processings targets, and in the case in which the other processing of the paired alignment processings which is executing the processing in the revere sequence has not been completed, the arithmetic processing unit which has completed the processing takes over the processing for a part of the remaining pixels of the processing target. In the present embodiment, the paired alignment processings are executed on a line basis in the reverse sequences to each other (refer to FIG. 14). The alignment processing which has completed the processing in first takes over the processing for a part of the remaining pixels that is the processing target of the other alignment processing. At this time, the two arithmetic processing units come to execute the alignment processings in the reverse sequences for the remaining pixels of the relevant one line on the same reference frame, respectively (refer to FIG. 15).

Figure 13:
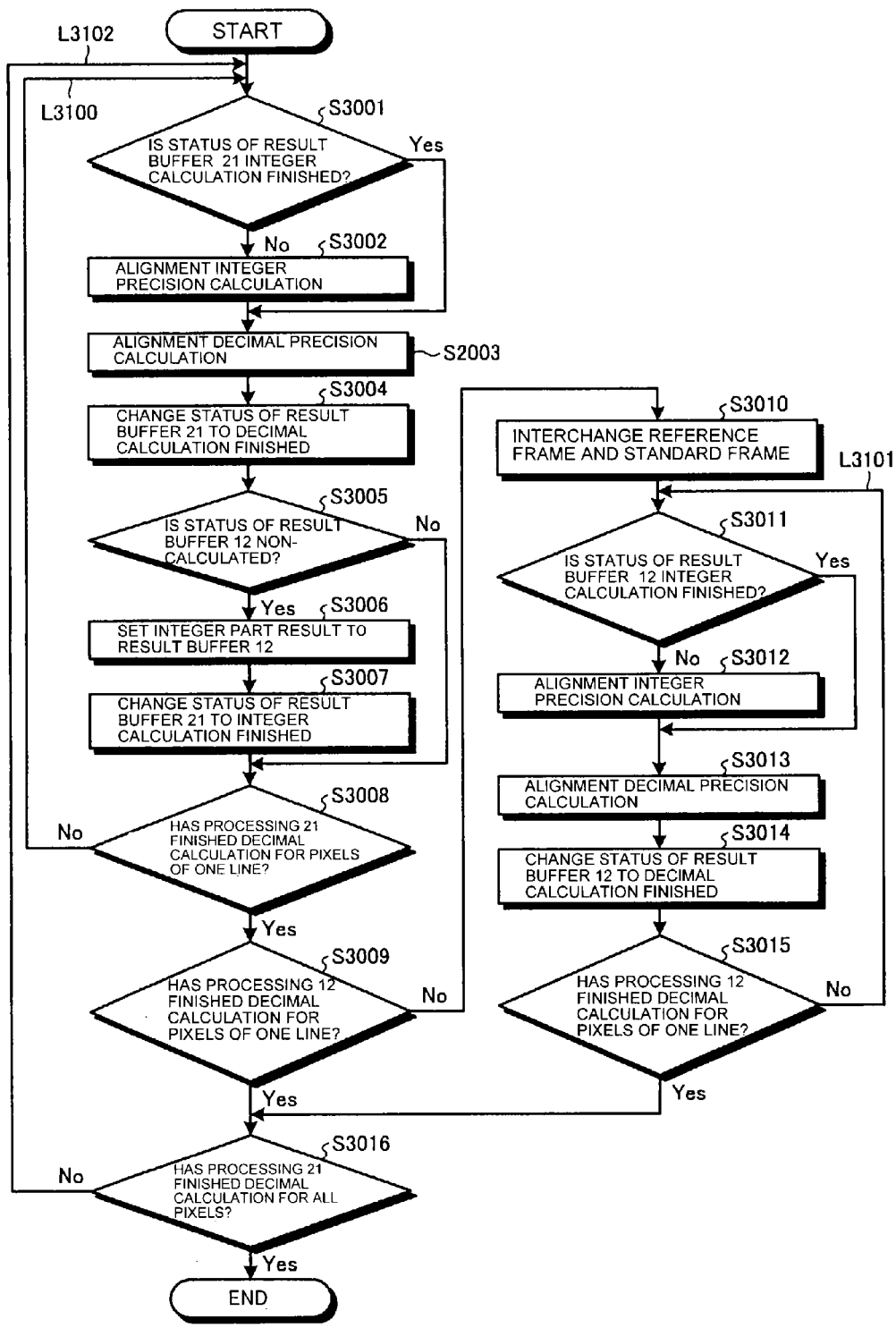
FIG. 13 is a flow chart of an alignment processing by a method to directly write the processing result into a result buffer of a partner in a third embodiment.

Also in the present embodiment, the first processing system in FIG. 5 will be described, for example. FIG. 13 is a flow chart of the present embodiment. A step S3001 through a step S3007 are the same as the step S1001—the step S1007 in the first embodiment and the step S2001—the step S2007 in the second embodiment. Here, their description will be omitted.

In the present embodiment, in the reference frames that are the processing targets of the alignment processing [21] and the alignment processing [12], respectively (at this time, the reference frame of one of the alignment processings is the standard frame of the other alignment processing), the alignment processing [21] and the alignment processing [12] are executed in the reverse sequences each other for the corresponding one line. When one processing of the alignment processings for one line is finished in first, the arithmetic processing unit which has finished its processing in first takes over a part of the other processing. For this reason, it is determined in a step S3008 whether the alignment processing [21] has finished the decimal calculation for the pixels per line for the relevant one line.

At this time, when the alignment processing [21] has not completed the calculation to the decimal precision for the pixels of the relevant one line at the reference frame (NO, in the step S3008), the processing returns to the step S3001 (L3100), and the processing of the step S3001 or later for the next pixel are executed. On the other hand, when the alignment processing [21] has completed the calculation to the decimal precision for the pixels of the relevant one line at the reference frame (Yes, in the step S3008), it is further determined in a step S3009 whether the alignment processing [21] has finished the decimal calculation for the pixels of the corresponding one line of the reference frame. These determinations can be performed by referring to the status of the result buffer [21] of the alignment processing [21] and the status of the result buffer [12] of the alignment processing [12].

Here, when the alignment processing [12] has also finished the decimal calculation for the pixels of the relevant one line of the reference frame (Yes, in the step S3009), it is determined in a step S3016 whether the alignment processing [21] has finished the decimal calculation for the all pixels of the reference frame. This determination can be performed by referring to the status of the result buffer 12 of the alignment processing [12].

In the determination, when the decimal calculation has been finished for the above-described all pixels (Yes, in the step S3016), the alignment processing [21] ends. If not (No, in the step S3016), the processing returns to the step S3001 (L3102), and the processing of the step S3001 or later is executed for the next one line.

In the above-described step S3009, when it is determined that the alignment processing [12] has not finished the decimal calculation for the pixels of the relevant one line of the reference frame (No, in the step S3009), in a step S3010, the arithmetic processing unit (PE3) exchange interchanges the reference frame and the standard frame of the alignment processing [21]. Thereby the arithmetic processing unit (PE3) can execute an alignment processing [12].

A step S3011—a step S3014 following the step S3010 correspond to the step S3001—the step S3004 and are originally executed by the alignment processing [12]. Here, the alignment processing [21] which has finished the processing in first takes over a part of the alignment processing [12] (refer to FIG. 15). That is, the arithmetic processing unit (PE3) which executes the alignment processing [21] takes over a part of the processing of the arithmetic processing unit (PE1). And it is determined in a step S3015 whether the alignment processing [12] has finished the decimal calculation for the all pixels of the reference frame side. At this time, when the decimal calculation has not been finished (No, in the step S3015), the processing returns to the step S3011 (L3101), and thereby a series of the processings of the step S3011 or later is repeated. On the other hand, when the decimal calculation has been finished (Yes, in the step S3015), the processing is moved to a step S3016.

Figure 15:
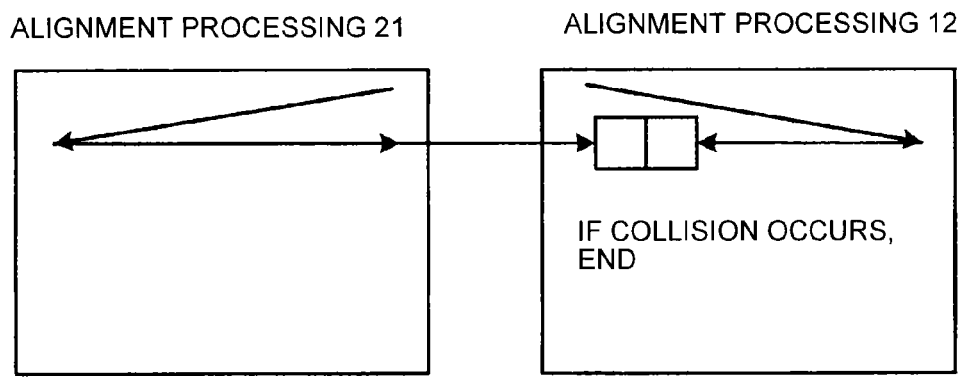
FIG. 15 is a diagram showing taking over a part of the alignment processing [12] by the arithmetic processing unit performing the alignment processing [21].

Incidentally, as shown in the right side of FIG. 15, when a pixel at the reference frame of the take over alignment processing by the arithmetic processing unit (PE3) and a pixel at the reference frame of the original alignment processing [12] move in the reverse sequence each other on a certain line and they coincide with each other, the status of the result buffer [12] becomes "decimal calculation finished" for the all pixels of the relevant line at the reference frame of the alignment processing [12]. At this time, in the step S3015, the all pixels of the relevant one line at the reference frame have been determined as "decimal calculation finished", and a series of the processings shown in FIG. 13 end.

As described above, according to the present embodiment, when one of the paired alignment processings has finished the processing in first with respect to one line that is the processing target, the arithmetic processing unit which has finished the processing in first takes over a part of the other of the paired alignment processings, and thereby the processing speed of the paired alignment processings as a whole can be improved. In addition, the paired alignment processings are completed in sequence for the same lines on the respective reference frames, the processing speeds of the alignment processings which operate in parallel can be adjusted on a line basis. In addition, as a result, the address range of a memory which is referred at the same time can be limited, and thereby the cache memory 105 can be effectively utilized. In addition, the improvement in the processing speed can be expected by the effective use of the cache memory 105.

As described above, according to the present embodiment it is possible to provide an image processing apparatus and an image processing method which, for the super-resolution processing, can efficiently operate a plurality of arithmetic processing units in parallel, and further can effectively perform memory access.

In the above-described embodiment 1, the embodiment 2, and the embodiment 3, the alignment processing [12] and the alignment processing [21] are explained as the paired alignment processings. But, in the case of the other paired alignment processings such as the alignment processing 23 and the alignment processing 32, and the alignment processing 45 and the alignment processing 54, the paired alignment processings can be processed in the same manner as the above description.

According to any one of the embodiments, it is possible to provide an image processing apparatus and an image processing method which, for the super-resolution processing, can efficiently operate a plurality of arithmetic processing units in parallel, and further can effectively perform memory access.

In addition, the program executed in the image processing apparatus of the embodiment is previously installed in a nonvolatile memory device such as a ROM and an HDD provided in the image processing apparatus and it is provided.

The program executed in the image processing apparatus of the embodiments may be configured to be provided in the state in which it is recorded in a file of an installable format or an executable format in a machine-readable record medium such as a CD-ROM, a flexible disk (FD), a CD-R, a DVD (Digital Versatile Disk).

In addition, the above-described program may be configured to be stored on a computer connected to a network such as Internet, and to be provided or distributed through the relevant network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. For example, in the above-described embodiments, although the image processing apparatus has been explained focusing on the software processing by the multi-core CPU 100, but the same scheme can be used in the case of a system configuration by a dedicated hardware. In that case, each of the arithmetic processing units 101-104 shown in FIG. 1 is constituted by a dedicated alignment device, and high-speed memory readable in small clock cycles is used as the cache memory 105.

What is claimed is:

1. An image processing apparatus, which performs alignment of pixels on a reference frame of a plurality of reference frames and on a standard frame of a plurality of standard frames, executes a reconfiguration of an image based on a result of the alignment, and generates a high resolution image of a frame from low resolution images of the reference frame and the standard frame, the image processing apparatus comprising:
a main memory configured to store a video input to the main memory and to output an image processed video; and
a plurality of arithmetic processors configured to perform the alignment,
wherein the plurality of arithmetic processors, at the time of performing the alignment between the standard frame and the reference frame, are configured to perform, in parallel, a first alignment processing in a first direction from the reference frame to the standard frame by a first arithmetic processor of said plurality, and a second alignment processing in a second direction from the standard frame to the reference frame by a second arithmetic processor of said plurality, the second direction being opposite to the first direction, and
wherein processing results of the first alignment processing and the second alignment processing are shared among the plurality of arithmetic processors.

2. The image processing apparatus as recited in claim 1, wherein when a pixel of which a corresponding point pair of coordinates on the reference frame and the standard frame has already been calculated by one of the first arithmetic processor during the first alignment processing and the second arithmetic processor during the second alignment processing, a calculation result for the corresponding point pair of coordinates is used by the other of the first arithmetic processor and the second arithmetic processor without recalculating.

3. The image processing apparatus as recited in claim 2, further comprising:
a memory configured to provide memory areas to be accessed by each of the first arithmetic processor and the second arithmetic processor, which store the calculation result, and which are prepared for each pixel of an input image for each of the first alignment processing and the second alignment processing,
wherein when the one of the first arithmetic processor and the second arithmetic processor has finished calculation of the corresponding point pair of coordinates, and the other of the first arithmetic processor and the second arithmetic processor has not finished the calculation of the corresponding point pair of coordinates, the calculation result is stored in a memory area accessed by the other of the first arithmetic processor and the second arithmetic processor, and thereby the other of the first arithmetic processor and the second arithmetic processor uses the calculation result.

4. The image processing apparatus as recited in claim 1, wherein each of the first alignment processing and the second alignment processing align pixels of each of the reference frames in a reverse sequence, and when one of the first arithmetic processor and the second arithmetic processor has completed alignment for all pixels one of the reference frames first, said one of the processors takes over alignment for a part of the non-processed pixels on another of the reference frames for the other of the processors.

5. The image processing apparatus as recited in claim 1, wherein each of the first alignment processing and the second alignment processing align pixels on a line at a same location on each of the reference frames in a reverse sequence, and when one of the first arithmetic processor and the second arithmetic processor has completed alignment for the one line first, said one of the processors takes over alignment for a part of the non-processed pixels on another line for the other of the processors.

6. The image processing apparatus as recited in claim 1, wherein the reconfiguration reconfigures the image from each of the standard frames by a pipeline operation upon receiving the processing results of the first alignment processing and the second alignment processing.

7. An image processing method used in an image processing apparatus comprising a plurality of arithmetic processors configured to operate in parallel, to generate a high resolution image of a frame from low resolution images of a plurality of frames by performing alignment of pixels on a reference frame of a plurality of reference frames and on a standard frame of a plurality of standard frames, and to perform reconfiguration of an image based on a result of the alignment, the image processing method comprising:

performing, in parallel, using the plurality of arithmetic processors, two alignment processes between the standard frame and the reference frame, comprising a first alignment processing in a first direction from the reference frame to the standard frame by a first arithmetic processor of said plurality, and a second alignment processing in a second direction from the standard frame to the reference frame by a second arithmetic processor of said plurality, the second direction being opposite to the first direction; and sharing, among the plurality of arithmetic processors, processing results of the first alignment processing and the second alignment processing.

8. An image processing apparatus, which performs alignment of pixels on a low resolution reference frame of a plurality of reference frames and on a low resolution standard frame of a plurality of standard frames, executes a reconfiguration of an image of the low resolution standard frame based on a result of the alignment, and generates a high resolution image of a frame from low resolution images of the reference frame and the standard frame, the image processing apparatus comprising:

a main memory configured to store a video input to the main memory and to output an image processed video;

a first arithmetic processor configured to execute a first alignment processing to perform alignment in a first direction between a standard frame and a reference frame extracted from the video input to the main memory;

a second arithmetic processor configured to execute a second alignment processing to perform alignment in a second direction between a standard frame and a reference frame extracted from the video input to the main memory, the second alignment processing being performed in parallel with the first alignment processing, the second direction being opposite to the first direction; and a cache memory accessed by the first arithmetic processor and the second arithmetic processor, configured to store processing results of the first alignment processing and the second alignment processing so that the processing results of the first alignment processing and the second alignment processing are shared between the first arithmetic processor and the second arithmetic processor.

* * * * *